Oct. 6, 1936. F. C. CRAWFORD 2,056,257
JOINT
Original Filed March 6, 1933 2 Sheets-Sheet 1
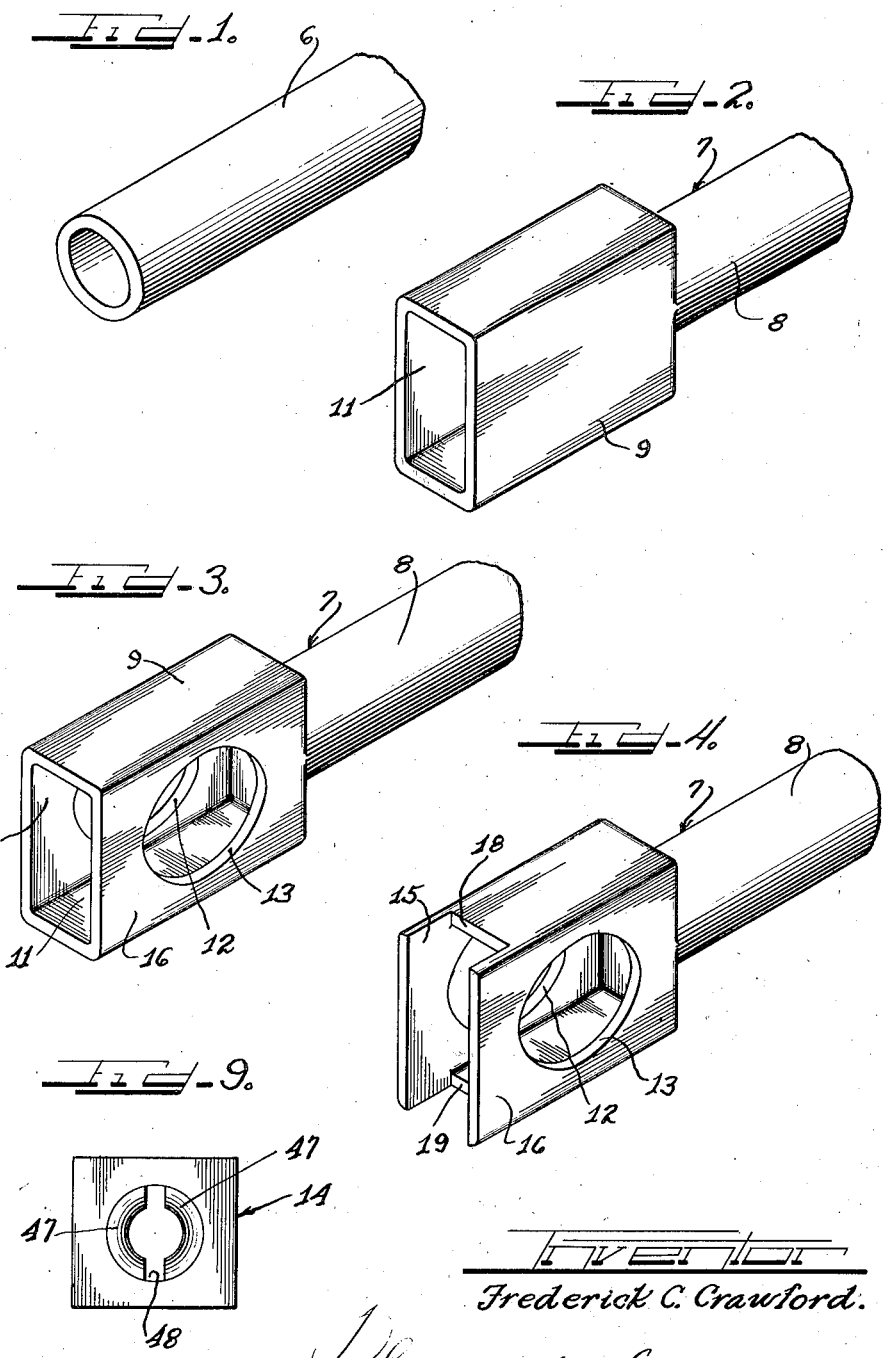

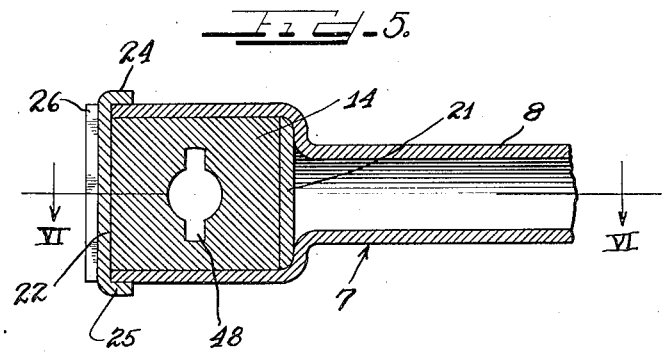
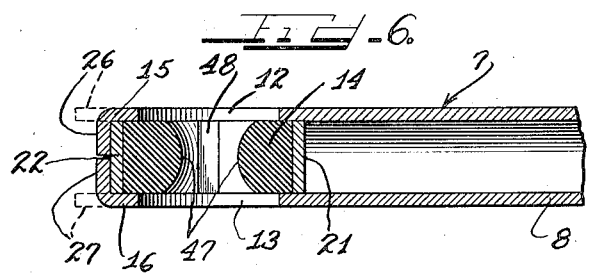
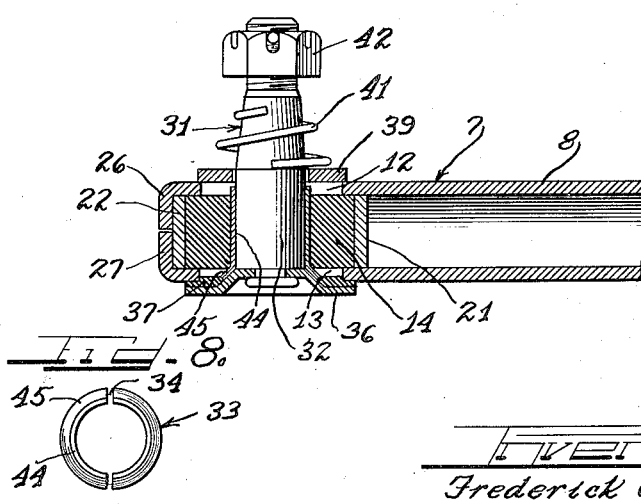

Patented Oct. 6, 1936

2,056,257

UNITED STATES PATENT OFFICE 2,056,257

JOINT

Frederick C. Crawford, Cleveland, Ohio, assignor to Thompson Products, Incorporated, Cleveland, Ohio, a corporation of Ohio Original application March 6, 1933, Serial No. 659,773, now Patent No. 2,025,727, dated December 31, 1935. Divided and this application January 22, 1934, Serial No. 707,622

9 Claims. (Cl. 287—85)

This invention relates to an improved joint construction and will be hereinafter described as incorporated in devices suitable for use in steering mechanisms for automotive vehicles.

This application is a division of my prior co-pending application entitled "Method of making joints", Serial No. 659,773, filed March 6, 1933, now a patent, No. 2,025,727 of Dec. 31, 1935.

An object of this invention is the provision of an improved joint of the class identified which is extremely durable, of simple construction, and which is designed to be automatically adjusted to compensate for wear of the relatively movable engaging friction surfaces.

Another object is the provision of a joint wherein a rubber packing or the like is employed for exerting a radial compression upon a metallic sleeve to maintain the sleeve in constant and substantially uniform frictional engagement with a bearing portion of one of the relatively movable joint members, to obviate the necessity of service or manual adjustment.

Another object of this invention is to produce a novel socket element for the joint from a single piece of tubular metal.

Other and further objects of this invention will become apparent to those skilled in the art from the following specification and annexed drawings which form a part of this specification.

On the drawings:

Figure 1 is a perspective view of a tubular metal member from which a socket element incorporated in this invention may be formed.

Figures 2, 3 and 4 illustrate progresive steps in the forming of the metal tube into a socket element.

Figure 5 is a longitudinal cross-section through the element as shown constructed in Figure 4 and additionally illustrating a rubber bushing in the housing together with means for holding the bushing therein.

Figure 6 is a cross-sectional view taken substantially along the line VI—VI of Figure 5, and illustrating an additional step for the completion of the socket element.

Figure 7 is a longitudinal section through an assembled device according to this invention showing the mechanism illustrated in Figure 6 together with a stud and associated elements applied to the socket element for completing the joint.

Figure 8 is a top plan view of a metal sleeve incorporated in the invention, and Figure 9 is a top plan view of the rubber bushing employed in this device and also illustrated in Figures 5, 6 and 7.

As shown on the drawings:

This invention will be best understood by a description of the method by which it is fabricated. As illustrated in Figure 1, numeral 6 designates a metal tube adapted to be upset and expanded by any suitable well-known means for forming a socket element, designated as a whole by reference numeral 7, and comprising a tubular shank 8 at one end and a box-like housing 9 at the other end (Figure 2). For purposes of illustration, the box-like housing 9 is shown to be rectangular in cross-section, but this invention is not limited to any specific shape or form of the housing.

The housing 9 is open at one end, as indicated at 11, for the reception of a bushing 14, illustrated in Figure 9. After the necessary expanding operations have been completed for forming the housing 9, aligned openings 12 and 13 are formed in oppositely disposed side walls 15 and 16 to receive therethrough another element of the joint.

Figure 4 illustrates a further operation in which marginal portions of the top and bottom walls have been cut away forming recesses 18 and 19 at the open end.

The next step is illustrated in Figure 5 which shows the rubber bushing 14 in place. A plate 21 is seated in the bottom or end of the socket opposite the open end for closing communication between the housing and the hollow tubular shank 8. The bushing 14 is seated tightly against the plate 21 and is confined by a closure plate 22 seated in the recesses 18 and 19 and provided with flanges 24 and 25 engaging at opposite edges of the housing to prevent displacement.

The next operation comprises bending the marginal edges 26 and 27 of the sides 15 and 16 over the plate 22, thereby forming inwardly extending flanges for securely confining the plate 22 together with the bushing 14 and the plate 21 in position.

The completed joint, illustrated in Figure 7, additionally includes a stud member 31. Interposed between the bushing 14 and the bearing portion 32 of the stud, is a metallic sleeve 33 (Figure 8) having a cylindrical bearing portion 44 and a flared base portion 45. The sleeve 33 is preferably split, as indicated at 34, in order that it may be contracted by force exerted upon it by the bushing 14 for constantly maintaining the bearing portion 44 of the sleeve in firm engagement with the cylindrical bearing portion 32 of the stud 31 to compensate for wear of the relatively moving friction surfaces and to obviate the necessity of manual adjustments or repair of the joint.

Upon the lower end of the stud is secured a closure plate 36 for the opening 13 in the side wall 16. A resilient washer 37 is interposed between the margins of the plate 36 and the wall 16 to facilitate limited universal movement of the stud 31 relative to the socket element 7. A washer 39, disposed about the intermediate portion of the stud, normally closes the opening 12 through the side wall 15. It will be understood that when this device is in use, a suitable actuating arm or element to be actuated by the stud may be fitted upon the upper portion of the stud and confined between a coil spring 41 and a nut 42 on the stud member 31. The spring 41 serves to resiliently maintain the washer 39 in position.

The bushing 14 is preferably of a size and shape to snugly fit the housing 9 and is provided with a central opening through which the stud 31 is adapted to be inserted. The central opening of the bushing 14 is preferably provided with a plurality of axially convex sectors 47, as shown in Figures 6 and 9, which sectors are spaced from each other circumferentially, providing axially extending grooves or recesses, preferably of a channel shape as indicated at 48 (Figures 6 and 9).

Upon insertion of the stud 31, the material of the bushing 14 is deformed so that it flows circumferentially and enters the recesses 48. This construction obviates axial displacement of the bushing material and reserves the material at a point where it is most available for compensating for wear on the sleeve 33 and the stud 31. By this construction, it is possible to maintain a substantially constant pressure on the sleeve 33 and insure a uniform operation of the joint for a long period of time without perceptible deterioration.

From the foregoing description, it will be understood by those skilled in the art that the invention is not limited to the specific joint construction shown in the drawings, but is susceptible of various forms and modifications without departing from the principle thereof. It is desired therefore that the patent to be granted hereon shall not be restricted in any manner except as necessitated by the prior art.

I claim as my invention:

1. In a joint of the class described, a socket member including a shank and a housing integral with the shank, said housing including oppositely disposed side walls with aligned openings therethrough, inwardly extending flanges on said side walls substantially closing the free end of the housing, a bushing in said housing having a stud opening therethrough in alignment with the aligned openings through said side walls, and a confining element at each end of the housing engaged by said bushing.

2. In a joint of the class described, a socket member including a shank and a housing integral with the shank, said housing including oppositely disposed side walls with aligned openings therethrough, inwardly extending flanges on said side walls substantially closing the free end of the housing, a rubber bushing snugly fitted in said housing, a stud including a bearing portion disposed within said bushing, and a contractable metal sleeve snugly fitted on said stud and engaging said bushing.

3. In a joint of the class described, a socket member including a shank and a housing integral with the shank, said housing including oppositely disposed side walls with aligned openings therethrough, inwardly extending flanges on said side walls substantially closing the free end of the housing, a rubber bushing snugly fitted in said housing, a stud including a bearing portion disposed within said bushing and a contractable metal sleeve snugly fitted on said stud and engaging said bushing, and means on said stud closing the aligned openings through said side walls.

4. In a joint of the class described, a socket member including a shank and a housing integral with the shank, said housing including oppositely disposed side walls with aligned openings therethrough, inwardly extending flanges on said side walls substantially closing the free end of the housing, a rubber bushing snugly fitted in said housing, a stud including a bearing portion disposed within said bushing, and a contractable metal sleeve snugly fitted on said stud and engaging said bushing, said bushing having recesses dividing the portion engaging said sleeve into a plurality of sections and providing space for the flow of the bushing material.

5. In a joint of the class described, a socket member including a shank and a housing integral with the shank, said housing including oppositely disposed side walls with aligned openings therethrough, inwardly extending flanges on said side walls substantially closing the free end of the housing, a rubber bushing snugly fitted in said housing, a stud including a bearing portion disposed within said bushing and a contractable metal sleeve snugly fitted on said stud and engaging said bushing, and means on said stud closing the aligned openings through said side walls, said bushing having recesses dividing the portion engaging said sleeve into a plurality of sectors and providing space for the flow of the bushing material.

6. In a joint of the class described, a socket member including a shank and a housing integral with the shank, said housing including oppositely disposed side walls with aligned openings therethrough, inwardly extending flanges on said side walls substantially closing the free end of the housing, a rubber bushing snugly fitted in said housing, a stud including a bearing portion disposed within said bushing and a contractable metal sleeve snugly fitted on said stud and engaging said bushing, the opening through said bushing being normally smaller than the diameter of the stud, such that upon insertion of the stud the bushing is deformed, said bushing including a plurality of inwardly disposed axially convex sectors, said sectors being circumferentially spaced to provide space for the flow of material of the bushing upon insertion of the stud.

7. In a joint of the class described, a socket member including a shank and a housing integral with the shank, said housing including oppositely disposed side walls with aligned openings therethrough, inwardly extending flanges on said side walls substantially closing the free end of the housing, a rubber bushing snugly fitted in said housing, a stud including a bearing portion disposed within said bushing and a contractable metal sleeve snugly fitted on said stud and engaging said bushing, and means on said stud closing the aligned openings through said side walls, the opening through said bushing being normally smaller than the diameter of the stud, such that upon insertion of the stud the bushing is deformed, said bushing including a plurality of inwardly disposed axially convex sectors, said sectors being circumferentially spaced to provide space for the flow of material of the bushing upon insertion of the stud.

8. A housing for joints comprising a metal tube having an enlarged box like portion thereon with an open end, said box like portion being provided with flat side and edge walls, said side walls having aligned openings therein and extending flanges on said side walls substantially closing the open end of the box like portion.

9. A joint socket member comprising a shank and an enlarged box-like housing integral therewith having an open end, said housing including oppositely disposed side walls with aligned openings therethrough and said side walls extending beyond said box-like housing to provide tabs adapted to be inturned to substantially close the open end of said housing.

FREDERICK C. CRAWFORD.